(12) United States Patent
Fukami et al.

(10) Patent No.: US 9,594,169 B2
(45) Date of Patent: Mar. 14, 2017

(54) ALTITUDE DETECTING UNIT, LOADING/DRIVING APPARATUS, AND ALTITUDE DETECTING METHOD

(71) Applicant: HORIBA, Ltd., Kyoto (JP)

(72) Inventors: Shun Fukami, Kyoto (JP); Katsumi Uratani, Kyoto (JP)

(73) Assignee: Horiba, Ltd., Kyoto (JP)

( * ) Notice: Subject to any disclaimer, the term of this patent is extended or adjusted under 35 U.S.C. 154(b) by 70 days.

(21) Appl. No.: 14/831,507

(22) Filed: Aug. 20, 2015

(65) Prior Publication Data

US 2016/0054451 A1    Feb. 25, 2016

(30) Foreign Application Priority Data

Aug. 20, 2014 (JP) ................... 2014-167973

(51) Int. Cl.
| | | |
|---|---|---|
| *G01C 21/00* | (2006.01) | |
| *G01S 19/45* | (2010.01) | |
| *G01C 5/06* | (2006.01) | |
| *G01M 17/007* | (2006.01) | |

(52) U.S. Cl.
CPC ............ *G01S 19/45* (2013.01); *G01C 5/06* (2013.01); *G01M 17/007* (2013.01)

(58) Field of Classification Search
CPC ... G01S 19/45; G01C 5/06; F02C 7/04; F05D 2270/804
USPC ............ 701/4, 9, 14, 15, 469; 340/970, 977; 342/357.28
See application file for complete search history.

(56) References Cited

U.S. PATENT DOCUMENTS

| | | | | |
|---|---|---|---|---|
| 4,006,472 A | * | 2/1977 | Greene | G01C 5/005 250/231.13 |
| 4,355,294 A | * | 10/1982 | Ben-David | G08G 5/0052 340/970 |
| 5,450,329 A | * | 9/1995 | Tanner | G01S 5/0009 340/973 |
| 6,259,380 B1 | * | 7/2001 | Jensen | G01C 5/005 340/945 |
| 2011/0144910 A1 | | 6/2011 | Sakashita | |

FOREIGN PATENT DOCUMENTS

| | | |
|---|---|---|
| JP | 2001-108580 A | 4/2001 |
| JP | 2004-138553 A | 5/2004 |
| JP | 2006-214993 A | 8/2006 |
| WO | 2015-107627 A1 | 7/2015 |

OTHER PUBLICATIONS

EESR dated Jan. 19, 2016 issued for European Patent Application No. 15 181 589.1, 9 pgs.

* cited by examiner

*Primary Examiner* — Gertrude Arthur Jeanglaud
(74) *Attorney, Agent, or Firm* — Brooks Kushman P.C.

(57) ABSTRACT

The present invention intends to provide an altitude detecting unit capable of, while utilizing both the advantages of a satellite positioning system and a pressure sensor, making an altitude measurement error, which may occur when combining them, as small as possible, and provide the others, and has determined a conversion expression adapted to convert from pressure into altitude such that at each of multiple valid altitude measurement points at which a satellite positioning system detects accurate altitude, altitude based on pressure is made equal to altitude by the satellite positioning system.

5 Claims, 7 Drawing Sheets

ALTITUDE DETECTING UNIT, LOADING/DRIVING APPARATUS, AND ALTITUDE DETECTING METHOD

CROSS-REFERENCE TO RELATED APPLICATION

This application claims priority to JP Application No. 2014-167973, filed Aug. 20, 2014, the disclosure of which is incorporated in its entirety by reference herein.

TECHNICAL FIELD

The present invention relates to an altitude detecting unit adapted to detect the altitudes of a road where a vehicle runs, a loading/driving apparatus adapted to, on the basis of gradients calculated from the altitudes detected by the altitude detecting unit, calculate loads or driving forces to be given to a vehicle or a part of the vehicle, such as a chassis dynamometer, and an altitude detecting method.

BACKGROUND ART

The operation of a vehicle has been analyzed for development, specification of failure cause, and the like by making the vehicle actually run on a road, and simulating the situation of the road run with a test bench such as a chassis dynamometer.

For this purpose, it is preferable to, during a road run along a predetermined test running route, measure various states of a vehicle including the circumstances of the vehicle, such as outside temperature, altitude, and gradient as well as the states of the vehicle itself, such as an engine rotation number, throttle opening level, vehicle speed, brake pedal level, and emissions. For this reason, various units for measuring the emissions and the like, such as an exhaust gas analyzing unit and an altitude detecting unit, are mounted in the vehicle.

Meanwhile, among the circumstances, in particular, the gradient greatly affects a load (or driving force) acting on a vehicle, and therefore by accurately measuring the gradient during a road run, a load (or driving force) equivalent to the load can be put on a vehicle during a test on a test bench to thereby provide the simulation test on the test bench as an effective test closer to the road run.

As disclosed in JP-A2001-108580, as the altitude detecting unit, there has been known a unit adapted to, from pressures indicated by a pressure sensor, calculate altitudes at the time when a vehicle ran on a road, and gradients based on the altitudes.

This altitude/gradient calculation method using the pressure sensor has the advantage of being able to continuously acquire pieces of data without any break, but since pressure varies depending on weather, also has the disadvantage that values of the altitudes and gradients obtained from the pressures are lack in reliability.

On the other hand, in recent years, a satellite measuring system such as a GPS has been developed, and by mounting a receiver for the system (hereinafter referred to as a GPS receiver) in a vehicle, both of a position and altitude can be measured with considerable accuracy.

However, measurement data from the GPS receiver has the disadvantage that while a vehicle is running in a place where radio waves from a sufficient number of (e.g., four or more) satellites cannot be received, such as the shadow of a building or a tunnel, the reliability of a value of the measurement data is lost.

On the other hand, in the case of simply replacing measurement data from the GPS receiver with altitude data obtained from a pressure sensor in the section where the measurement data is unreliable, i.e., in the section where the GPS cannot perform measurement, stepwise difference appears in measured altitude at the point of switching between the altitude data by the GPS and the altitude data by the pressure sensor. As a result, a value of a gradient calculated from a distance differential of the measured altitude exhibits an extremely high (or low) value far from a true value at the time of the switching.

The occurrence of the large error in the value of the gradient as described is not preferable because the gradient is one of the most important parameters for reproducing a road run on a test bench.

SUMMARY OF INVENTION

Technical Problem

The present invention is made in order to solve the above-described problems at once, and intends to provide an altitude detecting unit capable of, while utilizing both of the advantages of the satellite positioning system and the pressure sensor, making a gradient measurement error, which may occur when combining them, as small as possible, and provide the others.

Solution to Problem

That is, the altitude detecting unit according to the present invention is one that detects altitude of a running vehicle along a test route, and is characterized by including the following components.

(1) A reception circuit that receives data indicating altitude of the vehicle from a satellite positioning system receiver, and data indicating pressure around the vehicle from a pressure sensor.

(2) A conversion expression generating circuit that generates a conversion expression for converting data indicating pressure around the vehicle from the pressure sensor, into data indicating the altitude of the vehicle. Note that the conversion expression is configured such that at each of multiple predetermined valid altitude measurement points at which valid altitude data is outputted from the receiver along the test running route, pressure altitude that is altitude obtained by converting pressure using the conversion expression is made equal to satellite positioning altitude that is altitude indicated by valid altitude data.

(3) An altitude calculation circuit that converts the data indicating pressure around the vehicle based on the conversion expression into data indicating altitude, and thereby calculates the altitude of the vehicle at a part of or along the whole of the test running route of the vehicle, In order to reduce the effect of an error in altitude based on pressure data by using pressure altitude only in the case where the reliability of satellite positioning altitude is unreliable such as in the case where the vehicle runs between buildings, and in other cases, utilizing satellite positioning altitude, it is desirable that the conversion expression generating circuit regard points just before and just after a satellite positioning invalid section, which is a section where valid altitude data is not outputted from the receiver, as two valid altitude measurement points, and that the conversion expression generating circuit generate a conversion expression corresponding to the satellite positioning invalid section. In addition, the altitude calculation circuit employs pressure altitude obtained by converting pressure indicated by pressure data in the satellite positioning invalid section on the basis of the conversion expression, as well as in satellite positioning valid sections that are sections where valid altitude data is outputted from the receiver, employing altitude indicated by altitude data from the receiver to thereby fix altitudes throughout the test running route.

In order to determine loads or the like for a test bench, gradients are necessary, and therefore it is preferable that the altitude calculation circuit uses the pressure altitude to also calculate gradients of a part or a whole of the test running route.

Furthermore, it is possible conduct an accurate test on a test bench, that is close in accuracy to a run on an actual road, by setting loads or driving forces for a loading/driving apparatus on the basis of the gradients detected by such an altitude detecting unit.

Advantageous Effects of Invention

According to the present invention configured as described above, since the conversion expression is determined such that at each of the multiple predetermined valid altitude measurement points at which accurate satellite positioning altitude can be obtained along the test running route, pressure altitude is made equal to satellite positioning altitude, and consequently altitude obtained by converting corresponding pressure can be provided as altitude that is not affected by weather or the like and may have minor error only.

In addition, since satellite positioning altitude and pressure altitude are equal to each other at each of the valid altitude measurement points, for example, even in the case of replacing satellite positioning altitude with pressure altitude, such as in the case of using the pressure altitude in place of the satellite positioning altitude, any discontinuous point where altitude abruptly changes, which would never appear in reality, is not present throughout the test running route. Accordingly, an error in gradient data calculated by differentiating pressure altitude can also be minimized.

BRIEF DESCRIPTION OF THE DRAWINGS

FIG. 4 is an altitude-related graph illustrating that altitude obtained from pressure is changed by the variation of weather or the like;

DESCRIPTION OF EMBODIMENTS

Embodiments of the present invention will hereinafter be described with reference to the drawings.

First Embodiment

Figure 1:
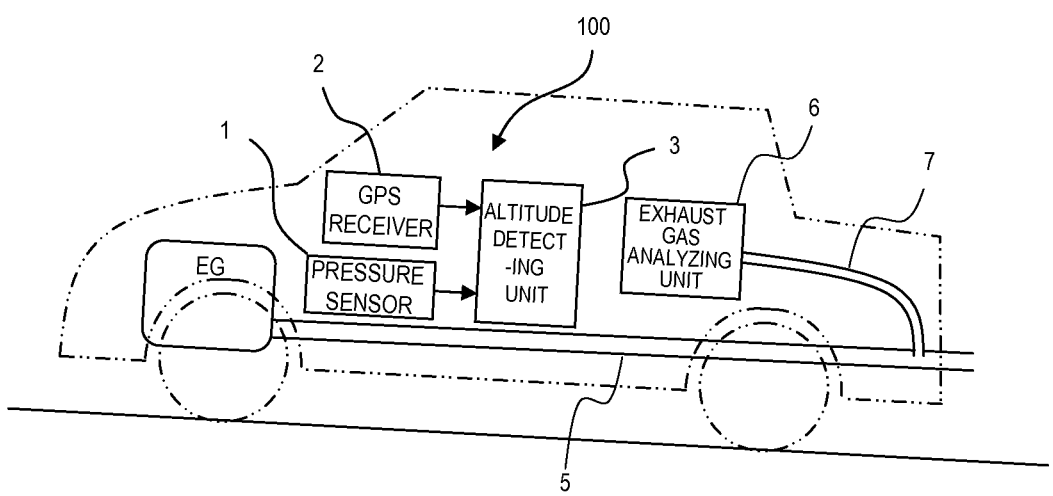
FIG. 1 is a schematic diagram illustrating a state where an altitude detecting system is mounted in a vehicle in one embodiment of the present invention.

FIG. 1 illustrates an altitude detecting system 100 according to the present embodiment. The altitude detecting system 100 is one that detects altitudes and gradients of a test running route along which a vehicle has run, and configured to include a pressure sensor 1, a GPS receiver 2, and an altitude detecting unit 3 mounted in the vehicle. Also, the altitudes and gradients detected by the altitude detecting system 100 are used for a simulation run on an in-room test bench having a loading/driving apparatus (not illustrated) such as a chassis dynamometer.

In addition, the vehicle in this embodiment mounts an exhaust gas analyzing unit 6 in addition to the altitude detecting system. The exhaust gas analyzing unit 6 is one that samples a part of exhaust gas through a sample pipe 7 of which a probe part is attached to a tail pipe of a vehicle exhaust pipe 5, and measures the concentrations of various predetermined components contained in the exhaust gas, and includes multiple component concentration meters such as a $CO_2$ concentration meter, $NO_x$ concentration meter, and THC meter.

Next, the respective components of the altitude detecting system 100 are described.

The pressure sensor 1 is herein of an electrostatic capacitance type using, for example, a semiconductor element. Note that as the pressure sensor, a pressure sensor based on another measurement method may be used, such as a vibration type pressure sensor.

The GPS receiver 2 (hereinafter also referred to as a receiver 2) is also a component of a so-called satellite positioning system, and receives radio waves from at least four satellites to output satellite positioning data including positional data indicating a position thereof, altitude data indicating altitude, time data indicating time when the position and the altitude were measured, and other data.

Further, the GPS receiver 2 is adapted to be able to also output validness determination data for determining the validness or reliability of the outputted positional data and altitude data as the satellite positioning data. The validness determination data refers to, for example, data indicating the number of satellites from which radio waves were received, and in the case where the number of satellites is two or less, any of the positional data and the altitude data is unreliable. Also, in the case where the number of satellites is three, the altitude data is unreliable. Further, in the case of four or more, as the number increases, the reliability of both the positional data and the altitude data increases.

Figure 2:
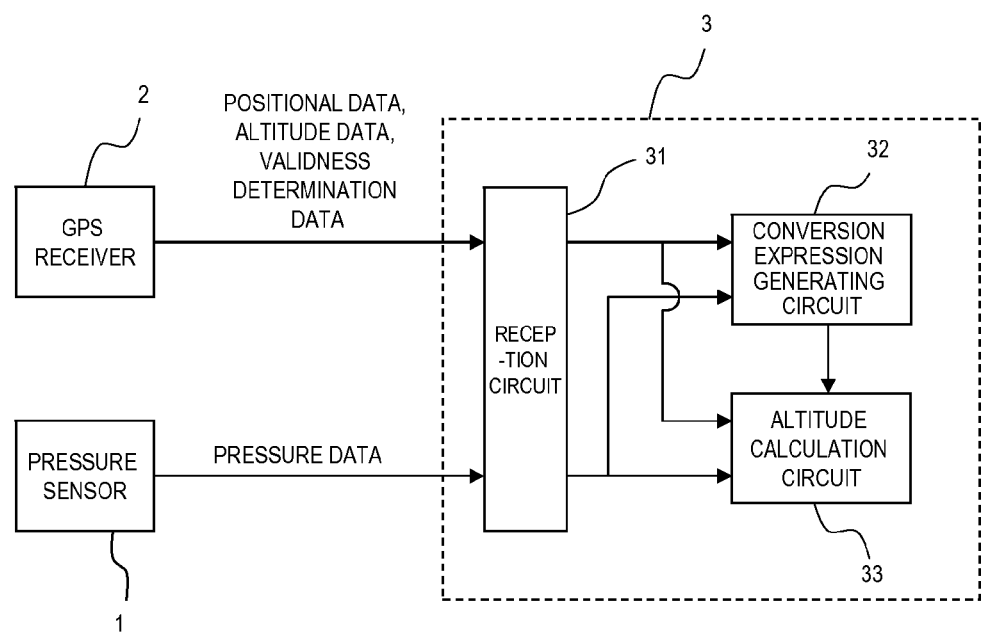
FIG. 2 is a functional block diagram of the altitude detecting system in the same embodiment.

The altitude detecting unit 3 is physically a dedicated or general-purpose computer including a CPU, a memory, an A/D converter, a communication port, and the like, and functionally, as illustrated in FIG. 2, fulfills functions as a reception circuit 31, conversion expression generating circuit 32, altitude calculation circuit 33, and the like by making the CPU and its peripheral devices cooperate in accordance with a predetermined program stored in the memory.

Next, the operation of the altitude detecting system 100 is described while also describing the respective parts of the altitude detecting unit 3.

When a test run starts on a road, the reception circuit 31 successively receives satellite positioning data including positional data indicating the position of a vehicle in running along a test running route, altitude data indicating altitude, and validness determination data from the receiver 2 of the satellite positioning system mounted in the vehicle, and stores the satellite positioning data in a satellite positional data storage part (not illustrated) set in a predetermined area of the memory. The reception circuit 31 also receives pressure data indicating pressure around the vehicle from the pressure sensor 1 mounted in the vehicle, and stores the pressure data in a pressure data storage part (not illustrated) set in a predetermined area of the memory.

Then, after the test run has been finished, the conversion expression generating circuit 32 checks the contents of all pieces of validness determination data obtained from the test run with reference to the satellite positioning data storage part, and divides the test running route into sections each in which the reliability of positional data and altitude data is poor (hereinafter also referred to as satellite positioning invalid sections) and reliable sections (hereinafter also referred to as satellite positioning valid sections Q). It is here assumed that for example, sections each in which the number of satellites indicated by validness determination data is four or more are defined as the satellite positioning valid sections Q, and the rest are defined as the satellite positioning invalid sections P (P1, P2). In addition, in order to increase the reliability of measurement accuracy in the satellite positioning valid sections Q, the condition for extracting the satellite positioning valid sections Q may be set as, for example, "reception from five or more satellites".

Figure 3A:
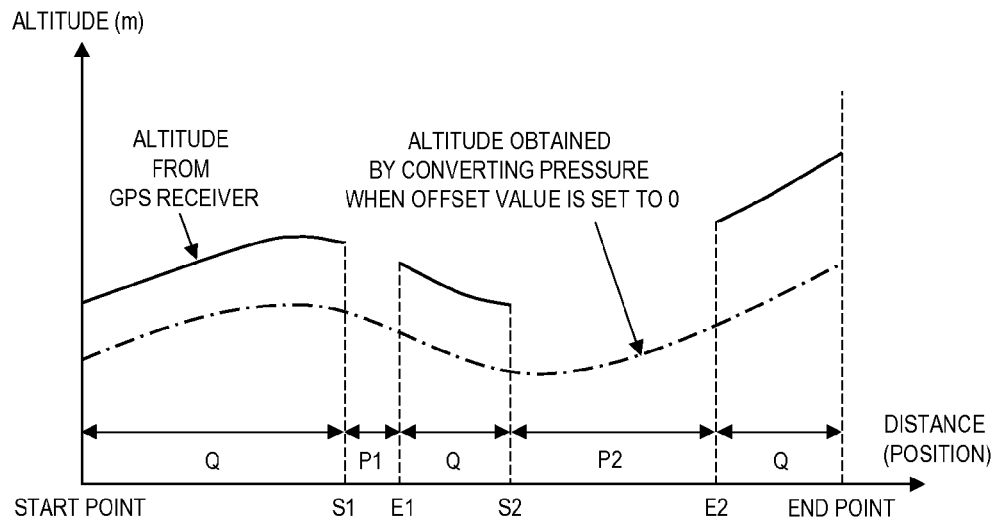
FIG. 3A is a graph schematically illustrating calculated altitude obtained by combining GPS altitude and pressure altitude in the same embodiment.
Figure 3B:
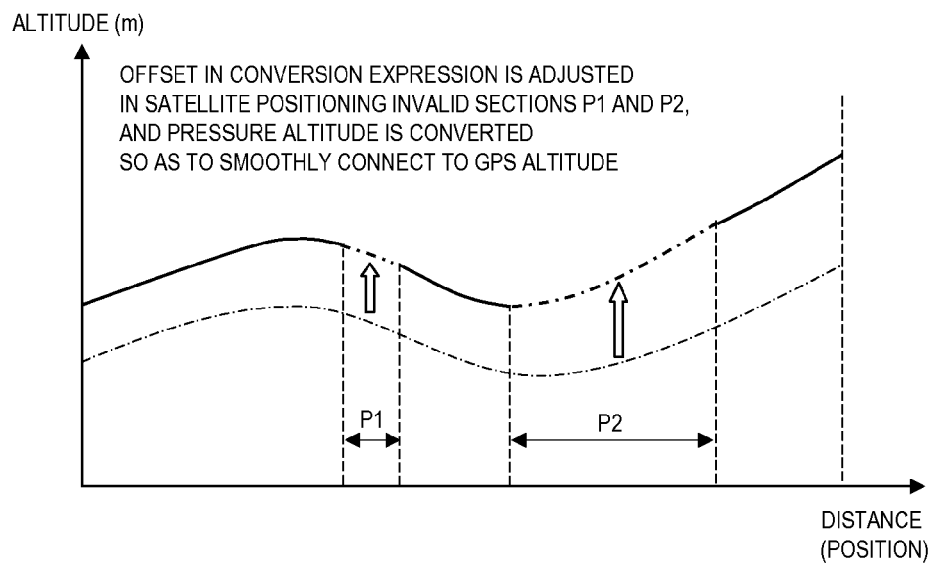
FIG. 3B is a graph schematically illustrating the calculated altitude obtained by combining the GPS altitude and the pressure altitude in the same embodiment.

It is assumed that as illustrated in FIG. 3, as a result of the division, two satellite positioning invalid sections P1 and P2 were recognized.

In each of the satellite positioning invalid sections P1 and P2, altitude obtained from the receiver 2 is unreliable, and therefore the conversion expression generating circuit 32 separately generates a pressure-altitude conversion expression (hereinafter also simply referred to as a conversion expression) for converting altitude in that satellite positioning invalid section P1 or P2 from pressure indicated by corresponding pressure data First, the first satellite positioning invalid section P1 is described.

The conversion expression generating circuit 32 recognizes points S1 and E1 just before and after the first satellite positioning invalid section P1 as valid altitude measurement points each at which valid altitude data is outputted from the receiver 2.

Then, the conversion expression generating circuit 32 generates a pressure-altitude conversion expression that at each of the points S1 and E1, makes altitude indicated by the receiver 2 equal to altitude obtained by converting pressure.

Next, a specific procedure for generating the conversion expression is described.

A numerical expression for converting from pressure to altitude can be generally given by the following linear expression (1).

$$y = Ax + b \quad (1)$$

where y represents the altitude (m), x the pressure (Pa), and A and B coefficients.

Figure 4:
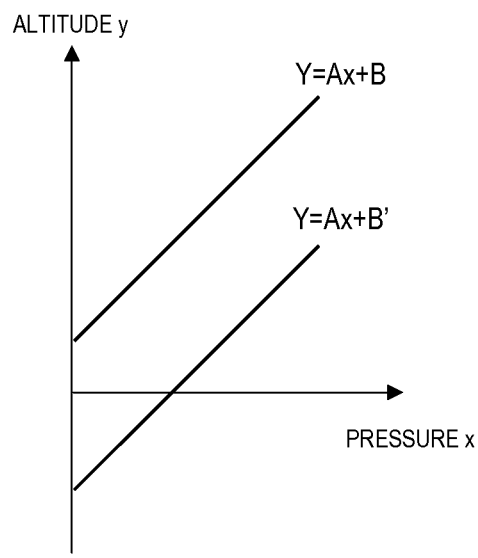

When weather is changed by the approach of low pressure or high pressure, A representing the relationship between a change in altitude and a change in pressure does not change, but the offset value B changes to, for example, B' as illustrated in FIG. 4.

For this reason, the conversion expression generating circuit 32 calculates an offset value $B_{S1}$ that makes the GPS altitude $Y_{S1}$ indicated by the receiver 2 at the just-before point S1 equal to the altitude by the pressure sensor 1. $B_{S1}$ can be obtained from the following expression.

$$B_{s1} = Y_{s1} - AX_{s1} \quad (2)$$

where $X_{S1}$ is the pressure indicated by the pressure sensor 1 at the just-before point S1.

Similarly, the conversion expression generating circuit 32 obtains an offset value $B_{E1}$ at the just-after point E1 from the following expression.

$$B_{E1} = Y_{E1} - AX_{E1} \quad (3)$$

where $X_{E1}$ is the pressure indicated by the pressure sensor 1 at the just-after point E1.

Subsequently, the conversion expression generating circuit 32 obtains a conversion expression for respective points from the just-before point S1 to the just-after point E1, i.e., the respective points in the first satellite positioning invalid section P1, on the basis of the above expressions (2) and (3).

To describe specifically, from the just-before point S1 toward the just-after point E1, an offset value of the conversion expression for the respective points in the first satellite positioning invalid section P1 is set to monotonously increase (for $B_{S1} < B_{E1}$) or monotonously decrease (for $B_{S1} > B_{E1}$).

Figure 5:
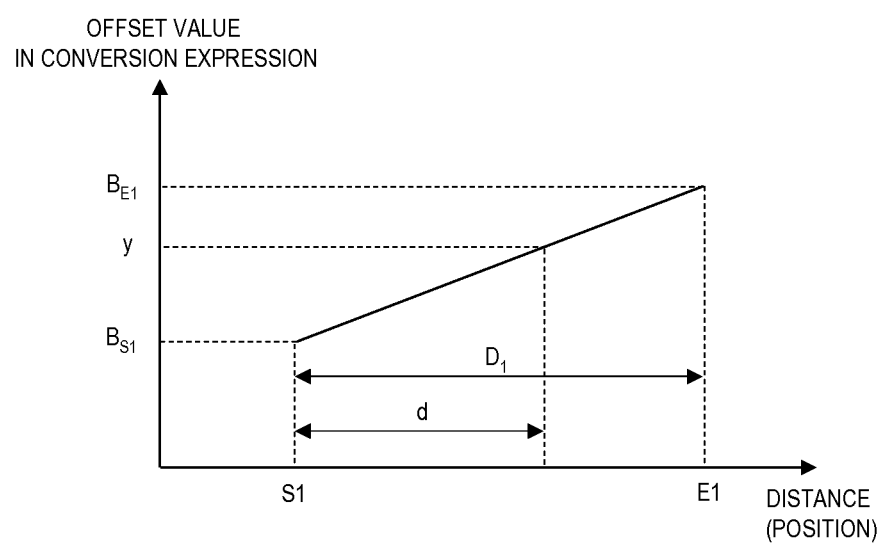
FIG. 5 is a schematic diagram illustrating a procedure for generating a conversion expression in the same embodiment.

Here, as illustrated in FIG. 5, for example, the offset value for the respective points in the first satellite positioning invalid section P1 is set to linearly change with respect to the distance d from the just-before position S1. The conversion expression generated as described is as follows.

$$y = Ax + \{(D_1 - d)/D_1\}B_{S1} + (d/D_1)B_{E1} \quad (4)$$

where $D_1$ represents the interval (m) of the first satellite positioning invalid section P1.

In this manner, the conversion expression generating circuit 32 generates the conversion expression that at the two points each at which valid altitude data is outputted from the receiver 2, i.e., at the two points S1 and E1 just before and after the first satellite positioning invalid section P1, makes the altitudes indicated by the receiver 2 and the altitudes obtained by converting the corresponding pressures equal to each other, and makes the offset value in the conversion expression smoothly change (here, linearly change as described above) in the first satellite positioning invalid section P1, and stores the conversion expression in a conversion expression storage part (not illustrated) set in a predetermined area of the memory.

In the same manner, the conversion expression generating circuit 32 generates a conversion expression for the second satellite positioning invalid section P2. The expression is as follows.

$$y = Ax + \{(D_2 - d)/D_2\}B_{S2} + (d/D_2)B_{E2} \quad (5)$$

Here, $D_2$ represents the interval (m) of the second satellite positioning invalid section P2. Also, $B_{S2} = Y_{S2} - A \cdot X_{S2}$ and $B_{E2} = Y_{E2} - A \cdot X_{E2}$ where $Y_{S2}$ represents altitude indicated by the receiver 2 at a point S2 just before the second satellite positioning invalid section P2, $X_{S2}$ represents pressure indicated by the pressure sensor 1 at the just-before point S2, $Y_{E2}$ represents altitude indicated by the receiver 2 at a point E2 just after the second satellite positioning invalid section P2, and $X_{khhgf}$ represents pressure indicated by the pressure sensor 1 at the just-after point E2.

After that, the altitude calculation circuit 33 fixes altitudes throughout the test running route by employing pressure altitudes obtained by, on the basis of the above respective conversion expressions, converting pressures indicated by pieces of pressure data in the respective satellite positioning invalid sections P1 and P2, as well as employing satellite positioning altitudes indicated by pieces of altitude data from the receiver 2 in the satellite positioning valid sections Q. Then, by calculating variations in altitude per unit distance, i.e., by differentiating the altitudes with respect to the distance, all gradients of the test running route are calculated.

Pieces of gradient data indicating the gradients are linked to pieces of corresponding positional data and pieces of corresponding altitude data on the test running route and stored in a running route data storage part (not illustrated) set in a predetermined area of the memory. Subsequently, as described above, the pieces of gradient data are provided to set loads or driving forces for a chassis dynamometer or the like in order to simulate the test run.

In addition, even in the case where the number of satellite positioning invalid sections is one or three or more, it is only necessary to generate a conversion expression for each of the satellite positioning invalid sections.

In the above-described configuration of the present embodiment, the disadvantage of the satellite positioning system, i.e., being unable to perform measurement in the satellite positioning invalid sections P1 and P2, can be covered and solved by using the pressure altitudes in the satellite positioning invalid sections P1 and P2.

In addition, at each of the boundaries between the satellite positioning valid sections Q in which satellite positioning altitudes can be used and the satellite positioning invalid sections P1 and P2 in which the pressure altitudes are used, a value of satellite positioning altitude and a value of corresponding pressure altitude are equal to each other, and therefore, the finally fixed measured altitudes throughout the test running route do not include any part that abruptly changes in a stepwise manner, which would never appear in reality. Accordingly, errors in pieces of gradient data calculated by differentiating the pressure altitudes can be minimized.

Also, since the different conversion expressions are used for the respective satellite positioning invalid sections P1 and P2 to calculate the pressure altitudes, and each of the conversion expressions refers to the start point E1 or E2 and the end point S1 or S2 of a corresponding reliable satellite positioning valid section Q, the pressure altitudes in the satellite positioning invalid sections P1 and P2 can also be provided as those that are not affected by weather or the like and respectively have small errors.

Further, this embodiment is configured to be able to mount the exhaust gas analyzing unit 6 in the vehicle to build a running analyzing system combined with the altitude detecting system 100, and at each time during a test run, grasp the concentrations of the respective exhaust gas components and the relationships between emission amounts of the respective components and altitude or gradient in a predetermined section. As a result, how the altitude or gradient changes the concentrations and emission amounts of the respective exhaust gas components can be examined to contribute to the development of vehicles or the specification of failure cause.

Second Embodiment

Figure 6:
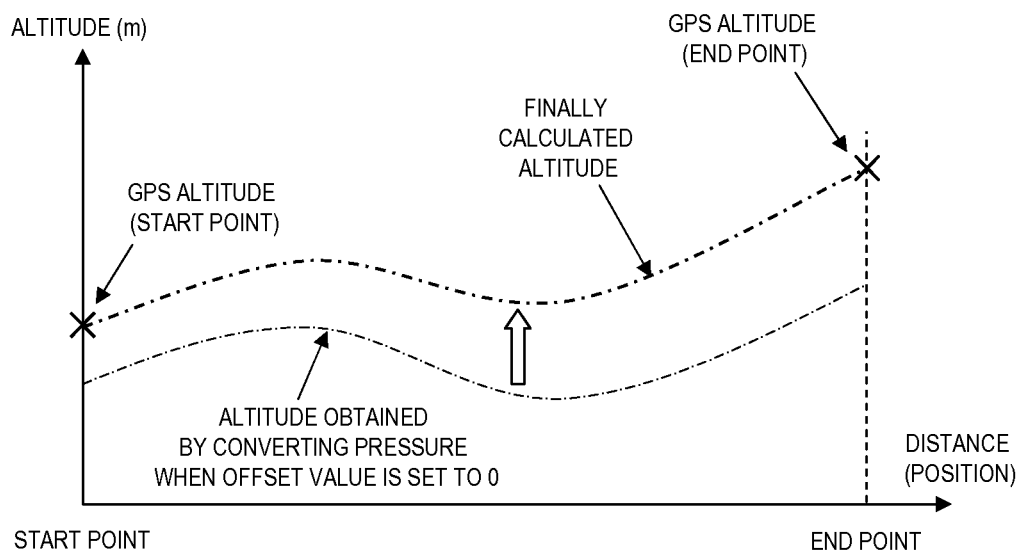
FIG. 6 is a graph schematically illustrating calculated altitude obtained by combining GPS altitude and pressure altitude in a second embodiment of the present invention.

Next, a second embodiment of the present invention is described with reference to FIG. 6.

In this embodiment, after a test run has been finished, a conversion expression generating circuit 32 checks the contents of pieces of validness determination data obtained from the test run with reference to a satellite positioning data storage part 34, and from a running route, extracts, for example, two most separated points where pieces of positional data and pieces of corresponding altitude data are reliable (hereinafter also referred to as satellite positioning valid points).

These two points are assumed to be, for example, the start and end points of the test running route.

Then, the conversion expression generating circuit 32 generates a pressure-altitude conversion expression that makes altitudes indicated by a receiver 2 and altitudes obtained by converting corresponding pressures at the start and end points equal to each other. A procedure for generating this conversion expression is obtained by simply replacing a just-before point and a corresponding just-after point in the above-described first embodiment with the start point and the end point in the present embodiment, and therefore detailed description is omitted.

Subsequently, an altitude calculation circuit 33 converts pressures indicated by pieces of pressure data into altitudes on the basis of the conversion expression throughout the test running route. After that, by calculating variations in the altitudes per unit distance, i.e., by differentiating the altitudes with respect to the distance, all gradients of the test running route are calculated.

Pieces of gradient data indicating the gradients are, as in the first embodiment, linked to pieces of corresponding positional data and pieces of corresponding altitude data on the test running route and stored in a running route data storage part.

In such a configuration of the present embodiment, since the conversion expression is configured to make the respective satellite positioning altitudes obtained at the two reliable satellite positioning valid points equal to the corresponding pressure altitudes, the pressure altitudes can be provided as those that are not affected by weather or the like and respectively have small errors.

Also, since throughout the test running rout, the pressure altitudes are used, and any part where altitude abruptly changes in a stepwise manner, which would never appear in reality is not present, errors in the pieces of gradient data calculated by differentiating the altitudes can be minimized.

Note that the two satellite positioning valid points are not limited to the start and end points, but two intermediate points may be appropriately selected.

Third Embodiment

Figure 7:
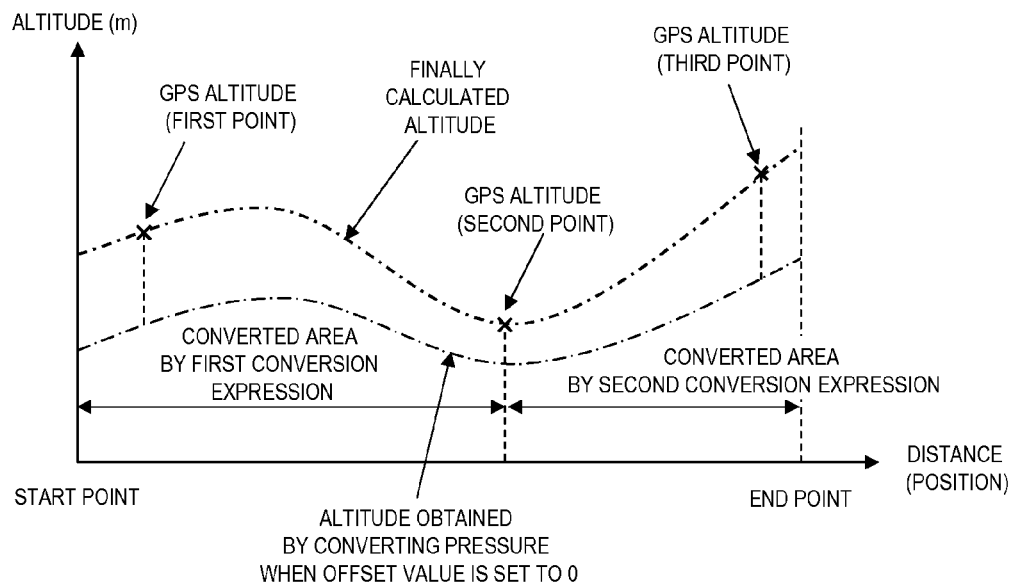
FIG. 7 is a graph schematically illustrating calculated altitude obtained by combining GPS altitude and pressure altitude in a third embodiment of the present invention.

Next, a third embodiment of the present invention is described with reference to FIG. 7.

In this embodiment, after a test run has been finished, a conversion expression generating circuit 32 extracts three or more (here, for example, three) satellite positioning valid points. The three points are sequentially referred to as a first point, a second point, and a third point.

Then, the conversion expression generating circuit 32 generates a pressure-altitude conversion expression that makes altitudes indicated by a receiver 2 and altitudes obtained by converting corresponding pressures at any two adjacent points equal to each other.

To describe more specifically, the conversion expression generating circuit 32 generates a first conversion expression that makes altitudes indicated by the receiver 2 and altitudes obtained by converting corresponding pressures at the first and second points equal to each other, and a second conversion expression that makes altitudes indicated by the receiver 2 and altitudes obtained by converting corresponding pressures at the second and third points equal to each other.

Then, an altitude calculation circuit 33 converts pressures indicated by pieces of pressure data into altitudes on the basis of the first conversion expression from the start point of a test running route to the second point, and from the second point to the end point of the test running route, converts pressures indicated by pieces of pressure data into altitudes on the basis of the second conversion expression.

Subsequently, as in the above-described second embodiment, the altitude calculation circuit differentiates the altitudes throughout the test running route obtained as described with respect to distance to calculate gradients throughout the test running route. Processing after that is the same as those in the first and second embodiments, and therefore description thereof is omitted.

In such a configuration of the present embodiment, since multiple conversion expressions are used, and configured such that pressure altitudes is made equal to respective corresponding satellite positioning altitudes obtained at three or more reliable satellite positioning valid points, the accuracy of pressure altitude can be made higher than that in the second embodiment.

In addition, although multiple conversion expressions are used, continuity in pressure altitude at boundaries between them is retained, and throughout the test running route, any part where altitude abruptly changes in a stepwise manner, which would never appear in reality, is not present, and therefore errors in pieces of gradient data calculated by differentiating pressure altitudes can be minimized.

Other Embodiments

Note that the present invention is not limited to any of the above-described embodiments.

For example, each of the embodiments is configured to, when obtaining a conversion expression between two points, linearly change an offset value of the conversion expression with respect to distance; however, the present invention may be configured to linearly change the offset value with respect to running time. Also, the offset value is not necessarily required to be linearly changed between two points, but may be nonlinearly changed. In particular, smoothly changing the offset value is preferable because no discontinuous gradient is detected.

The altitude detecting unit 3 is not necessarily required to be mounted in the vehicle, but may be provided outside the vehicle, for example, in a test bench. In such a case, it may be configured to equip the vehicle with only a data logger adapted to record respective pieces of data such as pressure data and GPS data, and input the respective pieces of data recorded on a recording medium of the data logger to the altitude detecting unit 3 successively by wireless during measurement, by wire, wireless, or another means after the end of the measurement, or by transferring the recording medium.

The altitude calculation circuit is only required to have at least a function of calculating pressure altitude, and a gradient calculating function may be made to be carried by, for example, an information processor of the loading/driving apparatus. Further, for example, in the case where the receiver is one adapted to also output gradient data indicating a gradient as satellite positioning data, the gradient data calculated by the receiver may be used in a satellite positioning valid section.

It may be configured not to generate a conversion expression after a test run, but to generate the conversion expression in real time during the test run to calculate altitude.

The altitude detecting unit may be one that displays GPS altitude and pressure altitude obtained in the above-described embodiments on a display part such as a display, for example, in real time during a run. In this case, the altitude detecting unit may be one that displays a graph as illustrated in FIG. 3 on the display part, or displays any one of the GPS altitude and the pressure altitude on the display part in the form of, for example, a graph or the like.

At this time, the altitude detecting unit may display the GPS altitude and the pressure altitude together with positional information indicating the position (latitude and longitude) of the vehicle (GPS receiver 2). Alternatively, the altitude detecting unit may display the GPS altitude and the pressure altitude together with calculated values such as vehicle speed and acceleration calculated from pieces of positional data on the GPS receiver 2. An operator such as a driver compares the displays of them, and can thereby determine whether or not the failure of the GPS receiver 2 occurs, such as a malfunction, or whether or not the GPS receiver 2 cannot receive or smoothly receive radio waves due to an obstruction such as a building.

In the case where before a test run on a road, the altitude detecting unit uses altitude data from the GPS receiver 2 to calculate an initial offset value of the conversion expression, and during the test run, compares pressure altitude obtained by the conversion expression offset using the initial offset value with corresponding GPS altitude, and the both deviate from each other by a predetermined value or more, it may be determined that failure such as a malfunction occurs in the GPS receiver 2. Note that to calculate the initial offset value, in addition to the altitude data from the GPS receiver 2, another altimeter or other altitude information may be used.

Besides, various modifications can be made to the present invention without departing from the scope the invention, such as appropriately combining parts of the above-described respective embodiments.

What is claimed is:

1. An altitude detecting unit that detects altitude of a running vehicle along a test running route, the altitude detecting unit comprising:
   a reception circuit that receives data indicating altitude of the vehicle from a satellite positioning system receiver, and data indicating pressure around the vehicle from a pressure sensor, the satellite positioning system receiver and the pressure sensor both being mounted on the test vehicle during running of a test;
   a conversion expression generating circuit that generates a conversion expression for converting data indicating pressure around the vehicle from the pressure sensor, into data indicating the altitude of the vehicle; and
   an altitude calculation circuit that converts the data indicating pressure around the vehicle based on the conversion expression into data indicating altitude, and thereby calculates the altitude of the vehicle at a part of or along the whole of the test running route of the vehicle,
   the altitude detecting unit being configured such that at each one of multiple predetermined valid altitude measurement points at which valid altitude data is outputted from the receiver along the test running route, pressure altitude, that is altitude obtained by converting pressure data using the conversion expression, is made substantially equal to altitude indicated by valid altitude data.

2. The altitude detecting unit according to claim 1, wherein:

in a satellite positioning invalid section, being a section where valid altitude data is not outputted from the receiver, the conversion expression generating circuit regards a point just before and a point just after a satellite positioning invalid section as two valid altitude measurement points, and the conversion expression generating circuit generates a conversion expression corresponding to the satellite positioning invalid section based on the valid altitude measurement points; and the altitude calculation circuit selects and fixes the pressure altitude values, obtained by converting pressure indicated by pressure data in the section on a basis of the conversion expression, for invalid sections of the test running route, and selects and fixes the altitude indicated by altitude data, obtained by the receiver, for valid sections of the test running route, valid sections being sections where valid altitude data outputted from the receiver is available.

3. The altitude detecting unit according to claim 1, wherein:

the altitude calculation circuit uses the pressure altitude to also calculate gradients of a part of the test running route or along the whole of the test running route.

4. A loading/driving apparatus for testing a vehicle or a part of the vehicle, the loading/driving apparatus calculating loads or driving forces acting on the vehicle or the part of the vehicle during a test run on a basis of the gradients of the test running route, the gradients being detected by the altitude detecting unit according to claim 3, and making the calculated loads or driving forces act on the vehicle or the part of the vehicle during the test.

5. An altitude detecting method that detects altitude of a running vehicle along a test route, the altitude detecting method comprising:

receiving data indicating altitude of the vehicle from a satellite positioning system receiver, and data indicating pressure around the vehicle from a pressure sensor, the satellite positioning system receiver and the pressure sensor both being mounted on the test vehicle during running of a test;

generating a conversion expression for converting data indicating pressure around the vehicle, from the pressure sensor, into data indicating the altitude of the vehicle, and making pressure altitude, that is altitude obtained by converting pressure data using the conversion expression, substantially equal to altitude indicated by valid altitude data, at each one of multiple predetermined valid altitude measurement points at which valid altitude data is obtained along the test running route, converting the data indicating pressure around the vehicle based on the conversion expression into data indicating altitude, and thereby calculating the altitude of the vehicle at a part of or along the whole of the test running route of the vehicle.

* * * * *